US008776171B2

(12) United States Patent
Piersol

(10) Patent No.: US 8,776,171 B2
(45) Date of Patent: Jul. 8, 2014

(54) GENERATING LOG WITH LOCATION AND ACCELEROMETER HISTORY

(75) Inventor: Kurt W. Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 477 days.

(21) Appl. No.: 13/042,288

(22) Filed: Mar. 7, 2011

(65) Prior Publication Data

US 2012/0233658 A1    Sep. 13, 2012

(51) Int. Cl.
    H04L 29/06    (2006.01)
(52) U.S. Cl.
    USPC .................... 726/2; 726/7; 707/608; 710/67
(58) Field of Classification Search
    None
    See application file for complete search history.

(56) References Cited

U.S. PATENT DOCUMENTS

| | | | | |
|---|---|---|---|---|
| 6,421,453 | B1 * | 7/2002 | Kanevsky et al. | 382/115 |
| 6,990,588 | B1 * | 1/2006 | Yasukura | 713/186 |
| 7,392,945 | B1 * | 7/2008 | Philyaw | 235/383 |
| 7,421,419 | B2 * | 9/2008 | Maren | 706/52 |
| 7,552,467 | B2 * | 6/2009 | Lindsay | 726/5 |
| 7,609,862 | B2 * | 10/2009 | Black | 382/124 |
| 7,725,926 | B1 * | 5/2010 | Karp et al. | 726/5 |
| 8,286,256 | B2 * | 10/2012 | Siegel et al. | 726/28 |
| 8,566,250 | B2 * | 10/2013 | Russell et al. | 705/67 |

FOREIGN PATENT DOCUMENTS

| | | |
|---|---|---|
| JP | 09-319875 | 12/1997 |
| JP | 2006-146736 | 6/2006 |
| JP | 2007-116318 | 5/2007 |
| JP | 2007-304851 | 11/2007 |
| JP | 2009-157918 | 7/2009 |
| JP | 2011-101118 | 5/2011 |

OTHER PUBLICATIONS

Sugimori, Daisuke; Iwamoto, Takeshi; Matsumoto, Michito. A Study about Identification of Pedestrian by Using 3-axis Accelerometer. IEEE 17th International Conference on Embedded and Real-Time Computing Systems and Applications. vol. 2. Pub. Date: 2011. Relevant pp. 134-137. http://ieeexplore.ieee.org/stamp/stamp.jsp?tp=&arnumber=6029874.*

International Search Report and Written Opinion, PCT/JP2012/055291, May 22, 2012, 8 pgs.

* cited by examiner

Primary Examiner — Cordelia Zecher
Assistant Examiner — Jeremiah Avery
(74) Attorney, Agent, or Firm — Patent Law Works LLP

(57) ABSTRACT

A method and system for generating a log with location and accelerometer history and verifying the authenticity of the user based on the log. A stroke and capture module captures stroke data from a user. A location identifier module identifies the portable computing device's location. An accelerometer determines the portable computing device's acceleration. A logging module generates metadata that includes the location and accelerometer history. A verification module receives the location and the accelerometer history. The verification module determines the user's mode of transportation based on the accelerometer history. The location and the mode of transportation are compared with information from an authority. If the data matches, the verification authenticates the document.

20 Claims, 12 Drawing Sheets

US 8,776,171 B2

GENERATING LOG WITH LOCATION AND ACCELEROMETER HISTORY

BACKGROUND OF THE INVENTION

1. Field of the Invention

The present embodiment of invention relates to generating a log of location and accelerometer history for electronic documents. In particular the present invention relates to receiving stroke input and generating logs of a time, a location and a mode of transportation of the portable computing device to verify the identity of the user.

2. Description of the Background Art

The use of portable computing devices has become commonplace for many users. In addition to having a conventional desktop computer, many users also have some type of portable computing device. Examples of present-day portable computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

Users download documents to their portable computing devices and make changes to the documents including signing electronic documents. Verifying the authenticity of the user and the user's input is essential to conducting business transactions. User input is currently verified by generating an electronic signature that includes various pieces of authenticating information including a user identifier that is stored on the portable computing device and a device identifier that is tied to the portable computing device. If another user takes the portable computing device and signs on the user's behalf, however, there is no way to verify that the proper user signed. Thus, what would be more helpful is a way to verify the authenticity of a user that inputs data onto a portable computing device.

SUMMARY OF THE INVENTION

The present embodiment of invention overcomes the deficiencies and limitations of the prior art by providing a method and system for generating logs with location and accelerometer history to verify the authenticity of users that input data on portable computing devices. In particular, the present embodiment of the invention provides a portable computing device that includes a location identifier module for scanning an area for location identifiers, tracks a user's location. The portable computing device also includes an accelerometer for measuring the acceleration. A logging module generates a log of the user's location and the accelerometer history.

A verification module verifies the authenticity of the user. In one embodiment, an authority provides the verification module with the user's location and mode of transportation. The verification module uses the accelerometer history to identify a mode of transportation and compares the user information with the authority's information. If they match, the verification module authenticates the document. If they do not match the authority or the user is notified of an error. In another embodiment, the logging module transmits the user's location and mode of transportation to the authority. The authority either verifies the authenticity of the document or refuses to verify the authenticity of the document. If the authority refuses to verify the authenticity of the document the verification module notifies the user of the refusal.

The present embodiment of the invention also includes a novel method for generating a log of data that includes the location and accelerometer history. The present embodiment of the invention also includes novel methods for verifying the authenticity of a user based on the log of data that includes the location and accelerometer history.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
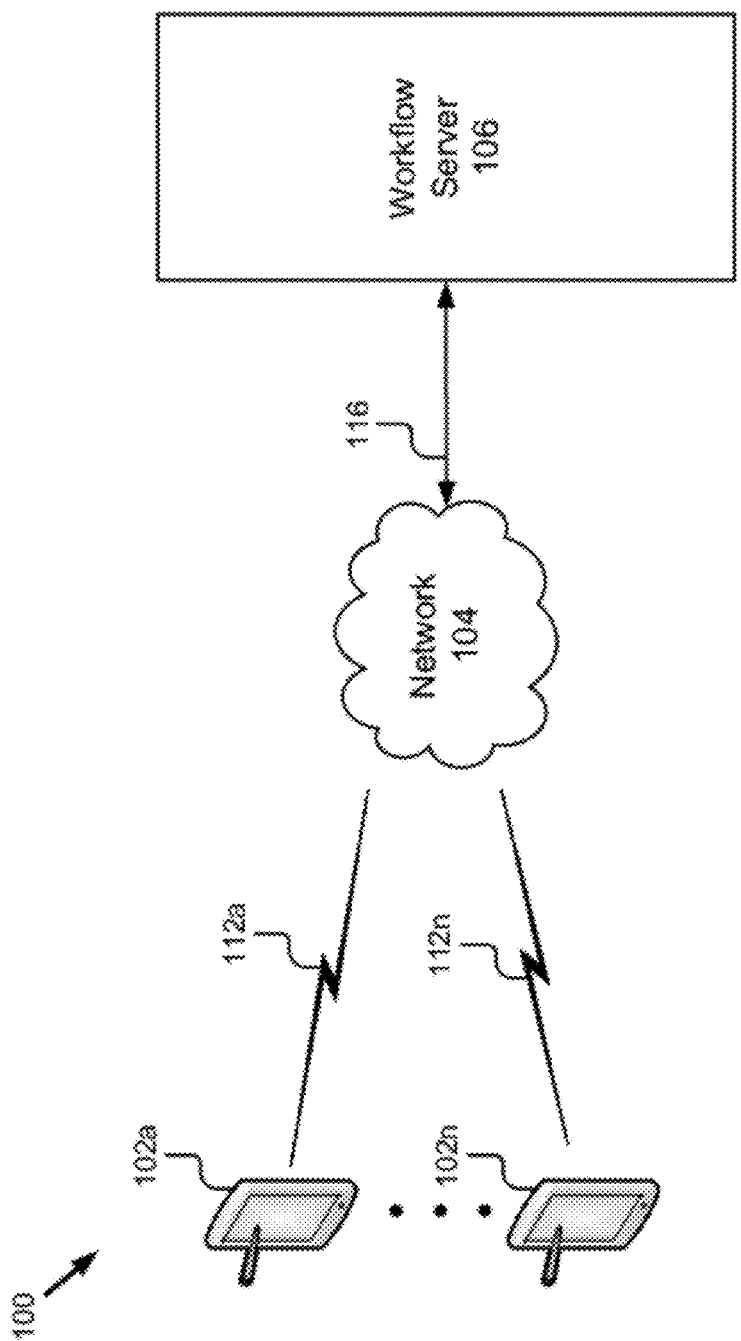
FIG. 1 is a block diagram of an embodiment of a system for routing documents in accordance with the present embodiment of invention.

A system for generating logs with location and accelerometer history to verify the authenticity of users that input data on portable computing devices. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram document in order to avoid obscuring the invention. For example, the present embodiment of invention is described in one embodiment below with reference to portable computing devices that are exemplified in a hardware and software platform like the Amazon Kindle that utilize electronic paper, e-paper or electronic ink display. However, the present embodiment of invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the document of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the document of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the document of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of invention is described with reference to a particular programming language. It will be appreciated that a variety of programming languages may be used to implement the teachings of the invention as described herein.

System Overview

FIG. 1 shows an embodiment of a system 100 for transmitting documents between portable computing devices and a server. Referring now to FIG. 1, this embodiment of system 100 comprises: a plurality of portable computing devices 102a-102n, a network 104, and a workflow server 106.

The plurality of portable computing devices 102a-102n is wirelessly coupled to the network 104 via respective couplings 112a-112n. The portable computing device 102 is coupled to the workflow server 106 via the network 104. The portable computing devices 102a-102n include a display, stroke capture capability, audio capture capability, gesture recognition capability and a wireless communication capability. The portable computing devices 102a-102n are adapted to receive images (e.g., documents or forms), add stroke annotations to the received images, and send the annotated received images. Embodiments of the portable computing devices 102a-102n will be described in more detail below with reference to FIG. 2A.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The workflow server 106 is coupled to the network 104 via signal line 116 for communication with the portable computing devices 102a-102n. The workflow server 106 includes modules for receiving data, logging changes in documents, selling applications and documents, registering devices, applications and forms, etc. The modules are described in greater detail in FIG. 2B.

In one embodiment, applications are made available on the workflow server 106 and transmitted to the plurality of portable computing devices 102a-102n via the network 104. The application generates a document that is displayed on the portable computing devices 102a-102n. A user inputs data onto the document, for example, by writing on the portable computing device 102a using a stylus. In one embodiment, the application includes a module for translating the stroke information into text. In another embodiment, the stroke data is transmitted to the workflow server 106 for further processing.

Although the system of FIG. 1 shows only one workflow server 106, it should be understood that there could be any number of additional workflow servers, for example dedicated to other functions, companies, institutions, organizational structures. A computing device 102a-102n may communicate with more than one workflow server 106. Particular pages or sections of a document could be associated with different workflow servers. Also, portions of a compound document can be forwarded rather than sending the entire compound document.

Portable Computing Device 102

Figure 2A:
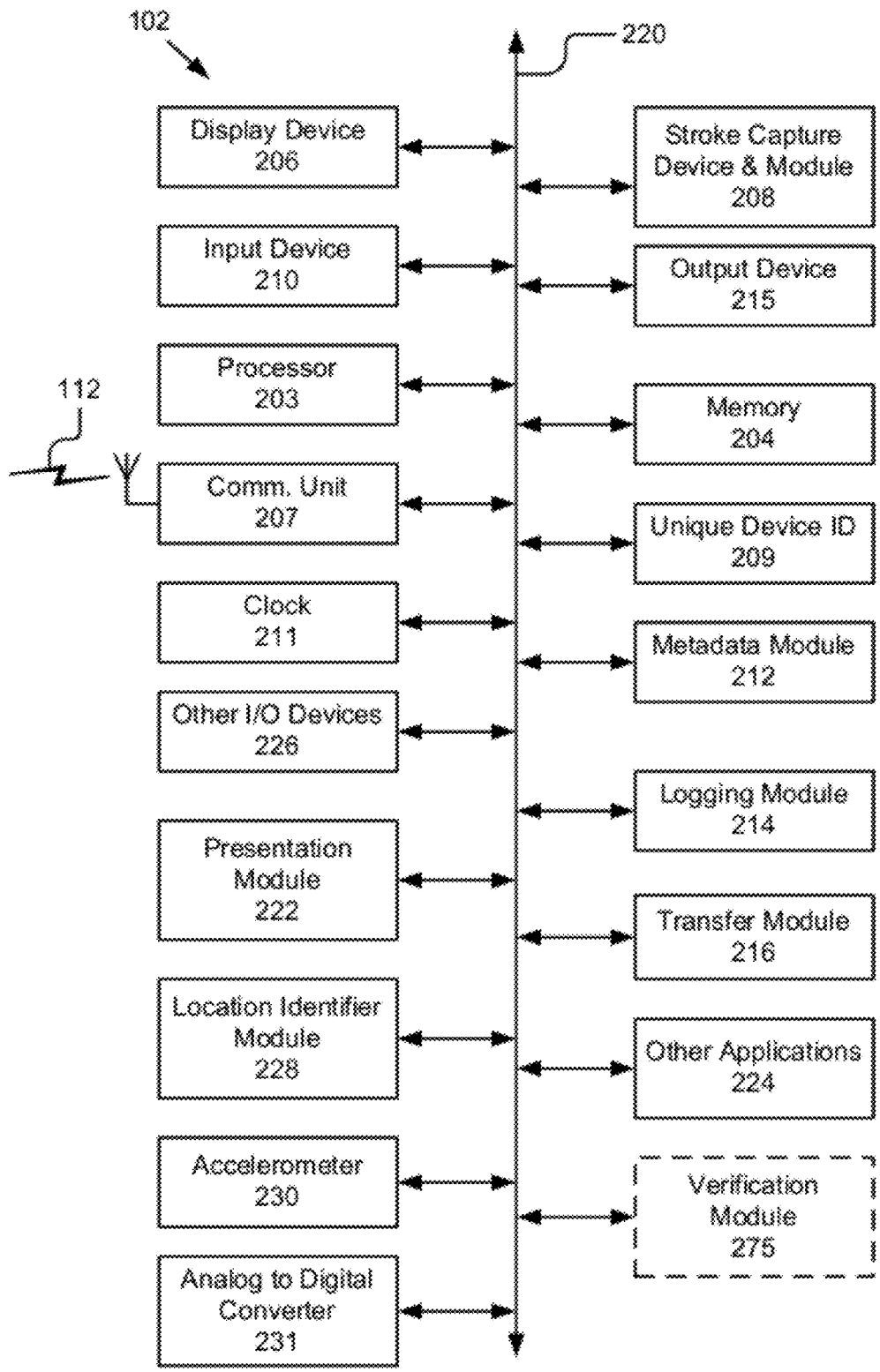
FIG. 2A is a block diagram of an embodiment of a portable computing device in accordance with the present embodiment of invention.

Referring now to FIG. 2A, the components of a portable computing device 102 are described. The portable computing device 102 comprises a display device 206, a stroke capture device and module 208, an input device 210, an output device 215, a processor 203, a memory 204, a communication unit 207, a unique device ID 209, a clock 211, a metadata module 212, other input/output (I/O) devices 226, a logging module 214, a presentation module 222, a transfer module 216, a location identifier module 228, an accelerometer 230, an analog to digital converter 231, other applications 224 and, optionally, a verification module 275.

The processor 203 comprises an arithmetic logic unit, a microprocessor, a general purpose controller or some other processor array to perform computations, provide electronic display signals to display device 206, and detect and process stroke inputs. The processor 203 is coupled to the bus 220 for communication with the other components of the computing device 102. Processor 203 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability of the computing device 102 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing device 102 also includes an operating system executable by the processor such as but not limited to WINDOWS®, MacOS X, Android, or UNIX® based operating systems.

The memory 204 stores instructions and/or data that may be executed by processor 203. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory such as a hard disk drive or flash drive for storing log information on a more permanent basis. The memory 204 is coupled by the bus 220 for communication with the other components of the computing device 102.

The communication unit 207 is coupled to an antenna and the bus 220. An alternate embodiment, the communication unit 207 may provide a port for direct physical connection to the network 104. The communication unit 207 includes a transceiver for sending and receiving compound documents. In one embodiment, the communication unit 207 includes a Wi-Fi transceiver for wireless communication with an access point. In another embodiment, the communication unit 207 includes a Bluetooth® transceiver for wireless communication with other devices. In yet another embodiment, the communication unit 207 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 207 includes ports for wired connectivity such as but not limited to USB, SD, or CAT-5, etc. The communication unit 207 links the processor 203 to the network 104 that may include multiple processing systems. The network of processing systems may comprise a local area network (LAN), a wide area network (WAN) (e.g., the Internet), and/or any other interconnected data path across which multiple devices may communicate. The communication unit 207 also provides other conventional connections to the network 104 for distribution of files (media objects) using standard network protocols such as TCP/IP, HTTP, SSH, git HTTPS and SMTP as will be understood to those skilled in the art.

The computing device 102 includes storage for a unique device identifier 209. The computing device 102 is coupled to the bus 220 to provide the unique identifier to other components as needed. In one embodiment, the storage is read only memory for storing the unique device identifier 209. In another embodiment, the unique device identifier 209 is a nonvolatile storage storing a public key-private key pair. In another embodiment, the public key-private key pair is stored within a specialized trusted computing memory integrated with the CPU or main board of the device. It is useful for the computing device 102 to have a unique identifier that is used to verify the authenticity of the user to ensure that changes made to an application were performed by an authorized entity.

In one embodiment, the unique identifier 209 is the hardware MAC address of a network chip in the computing device 102. The unique identifier 209 may be an internal part of another functional block, such as the communication unit 207, or in nonvolatile storage in memory unit 204. In another embodiment, the unique identifier is a unique ID associated with a memory card on the computing device 102, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing device 102 is manufactured with or configured with a private key and the public key disseminated. Then the computing device 102 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing device 102.

The clock 211 is a conventional type and provides an indication of local time for the computing device 102. In particular, the clock 211 is used to provide a local time at which compound documents are processed. This time value is also stored with data in the local log files using the logging module 214. The clock 211 is adapted to communicate this information to the processor 203 and the logging module 214 using the system bus 220.

The metadata module 212 is software including routines for extracting metadata from a document or image and storing metadata as part of a document. In one embodiment, the metadata module 212 is instructions executable by the processor 203 to provide the functionality described below with reference to FIGS. 7 and 8 for extracting metadata. In one embodiment, the metadata module 212 is stored in the memory 204 and is accessible and executable by the processor 203. In any event, the metadata module 212 is adapted for cooperation and communication with the processor 203, the location identifier module 228, the logging module 214 and other components of the computing device 102.

The logging module 214 is software including routines for creating and storing local logs in the memory 204, and more particularly, in a nonvolatile storage portion of the memory 204. In one embodiment, the logging module 214 is a set of routines executable by the processor 203 to store metadata in an entangled log at the computing device 102. The logging module 214 is particularly critical to provide verification of workflow completion in transactions. In one embodiment, the logging module 214 also includes routines for publishing or storing in a publicly available location on the network the logs of its particular computing device 102. The logging module 214 is coupled by the bus 220 to the processor 203, the memory 204, the location identifier module 228 and the communication unit 207. FIG. 3B below illustrates an example of the type of information that is stored in a log, FIG. 4B illustrates a compound document that contains all the metadata and FIG. 4C illustrates an example of a document directory.

The logging module 214 generates a cryptographic hash associated with each log entry hash data including the cryptographic hash of the previous log entry. The series of hashes that each incorporate the last hash is called a chained hash. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in U.S. Pat. No. 7,849,053 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are each herein incorporated by reference in their entirety.

The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are each herein incorporated by reference in their entirety. Thus logs containing cryptographic hashes or CBIs are maintained. The CBI of the recent log entries are stored in other log files and published via email or other protocols. These CBIs can later be used to verify that the log was not modified since the time the CBI was published.

The transfer module 216 is software and routines for transmitting and receiving applications and documents to and from the workflow server 106. In one embodiment, the transfer module 216 transmits applications to the workflow server 106 for display in the online marketplace. In other embodiments, the transfer module 216 sends and receives documents as formatted messages from any other computing device such as the workflow server 106. The transfer module 216 is coupled by the bus 220 for communication with the processor 203 and the communication unit 207. The transfer module 216 is responsible for transmitting and receiving the application, document or formatted message from the portable computing device 102 such as by email, file transfer, XMPP or special purpose application.

Aligned with the display device 206, there is a stroke capture device and module 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from a stylus, a finger or another implement. The stroke capture device 208 is a sensor for the stylus and has resolution sufficient to capture recognizable handwriting and printing and other drawings. In one embodiment, display device 206 is equipped with a touch screen in which a touch sensitive, transparent panel covers the screen of display device 206. The stroke capture device 208 and the display device 206 are coupled by the bus 220 to the memory 204, the processor 203, the presentation module 222 and the communication unit 207.

In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208. The stroke capture module 208 is software and routines for receiving stroke data, dividing the strokes into segments, and applying character recognition to the segments.

The location identifier module 228 is software including routines for scanning various access points and devices to determine the user's location. In one embodiment, the location identifier module 228 is a set of routines executable by the processor 203 to receive input from different sources including global positioning system (GPS) data, wireless fidelity (Wi-Fi) data, Bluetooth data, MAC addresses, etc. and determine the user's location. The location identifier module 228 is coupled by the bus 220 to the processor 203, the memory 204, the communication unit 207 and the logging unit 214.

The accelerometer 230 detects and measures movement of the portable computing device 102. In one embodiment, the accelerometer 230 is a 3D accelerometer. In particular, the accelerometer 230 is an ADXL330 (3D) manufactured and sold by Analog Devices, Inc. of Norwood, Mass. In another embodiment, the accelerometer 230 is a pair of 2D accelerometers. In particular, the accelerometer 230 is a pair of ADXL322 (2D) manufactured and sold by Analog Devices, Inc. of Norwood, Mass. The accelerometer 230 generates an analog signal in three axes. Accelerometer 230 is coupled to the analog-to-digital converter 231.

The analog-to-digital converter 231 converts the analog signal received from the accelerometer 230 to digital information. The analog-to-digital converter 2310 transmits the digital information to the logging module 214. The analog-to-digital converter 231 is coupled by the bus 220 to the processor 203, the memory 204, the accelerometer 230 and the logging module 214.

The bus 220 represents a shared bus for communicating information and data throughout the computing device 102. The bus 220 may represent one or more buses including an industry standard architecture (ISA) bus, a peripheral component interconnect (PCI) bus, a universal serial bus (USB), or some other bus known in the art to provide similar functionality. Additional components coupled to processor 203 through system bus 220 include the display device 206, the stroke capture device and module 208, the input device 210, the output device 215, the processor 203, the memory 204, the communication unit 207, the unique device identifier 209, the clock 211, the metadata module 212, the logging module 214, the transfer module 216, the image capture module, the presentation module 222 and the other applications 224. There may also be a plurality of busses in computing system 102, designed to provide the most efficient communications between functional elements.

The presentation module 222 is software and routines for displaying documents on the display device 206, and adjusting the display of the image responsive to input from input device 210. The presentation module 222 performs routines that cause the dual mode user interface to be displayed. In one embodiment, the presentation module 222 is a thin client routine executable by the processor 203 to cause display of the image on the display device 206. The presentation module 222 is coupled by the bus 220 to the display device 206, the processor 203, and the memory 204.

The other applications 224 include other software and routines executable by the processor 203 for various other types of functionality. In one embodiment, one or more application programs are executed by the processor 203 including, without limitation, word processing applications, electronic mail applications, financial applications, and web browser applications.

The computing device 102 may include one or more other I/O devices 226. For example, the other I/O devices 226 may include speakers to produce sound, microphones to record sound, a scanner or camera to record documents, images or video, and other sensors or feedback devices like pager motors, or haptic feedback. Optionally, the other I/O devices 226 may include one or more analog-to-digital or digital-to-analog converters, and/or one or more digital signal processors to facilitate audio processing. These other I/O devices 226 are coupled by bus 220 for communication with the processor 203 and the memory 204. Optionally, a microcontroller may be added as part of other I/O Devices 226 to facilitate power systems control, as well as off-load the main processor 203 from lower-speed lesser-important tasks.

In one embodiment, the portable computing device 102 includes a verification module 275. The verification module 275 is software and routines for receiving the log information related to an electronic document from the logging module 214, transforming the accelerometer history into a mode of transportation, receiving information about location and mode of transportation from an authority and comparing the log to the received information to determine whether there is a match. If there is a match, the document is authenticated. If there is not a match, the verification module 275 notifies the user of an error. In another embodiment, the verification module 275 is a set of routines executable by the processor 203 for transmitting the log information to an authority and receiving from the authority either verification for the document or a refusal to verify the document. If verification is refused, the verification module 275 notifies the user of the refusal.

The verification module 275 uses location and accelerometer history as an additional security measure to identify the user. When a user is signing documents, especially sensitive documents such as a mortgage or a power of attorney, verifying that the user of the portable computing device 102 is located in the same place as he claims to have been located further confirms the validity of the signature. Alternatively, if someone tries to commit identity theft, the verification module 275 provides additional evidence that someone other than the user signed the documents. For example, the portable computing device 102 owner spends the day working in Palo Alto, Calif. A credit card application purportedly signed by the owner of the portable computing device 102, however, was completed by a user on an airplane in Evanston, Ill. As a result, the credit card application was not signed by the user.

Workflow Server 106

Figure 2B:
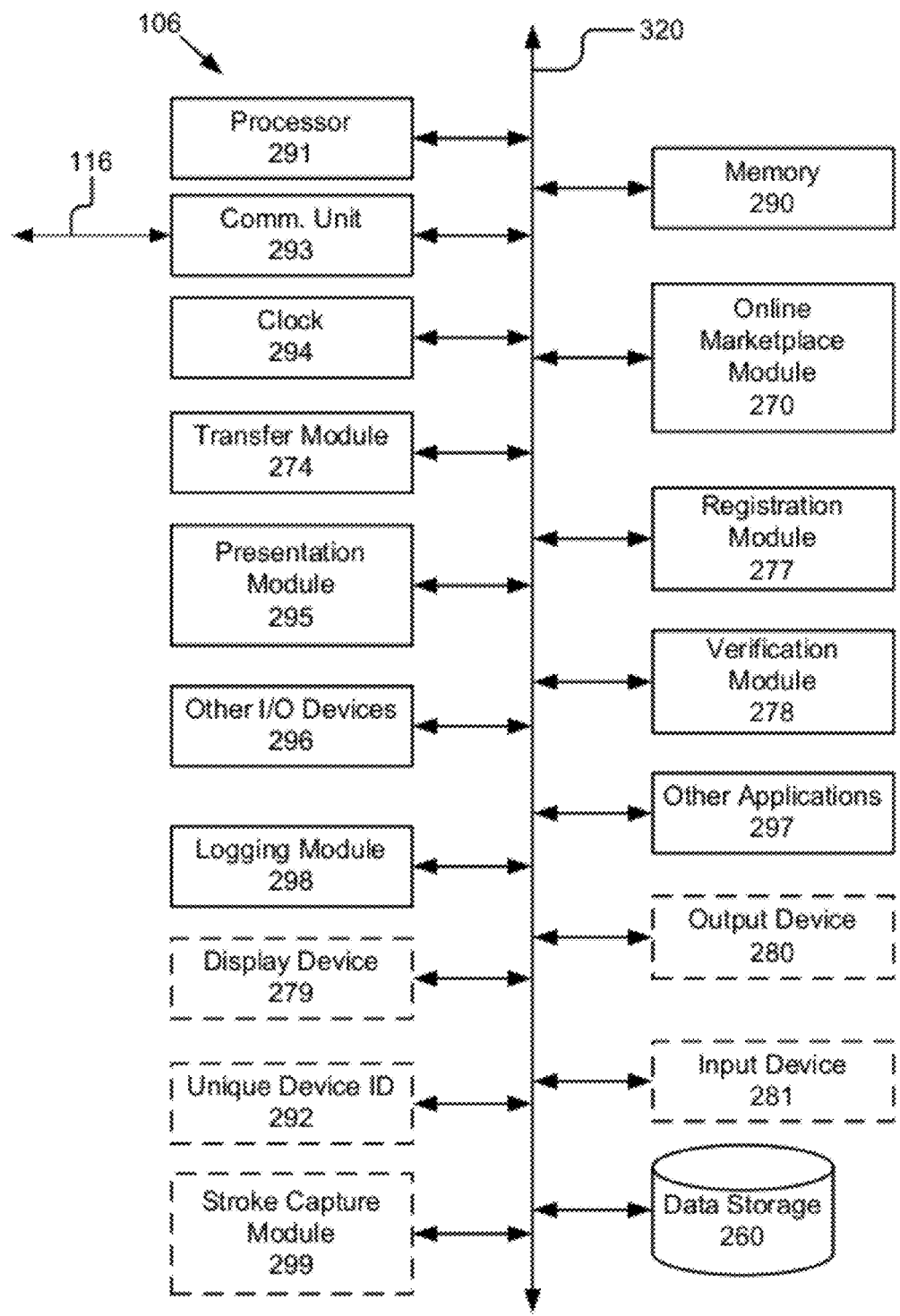
FIG. 2B is a block diagram of a workflow server in accordance with the present embodiment of invention.

Referring now to FIG. 2B, an embodiment of the workflow server 106 will be described in more detail. The workflow server 106 comprises a processor 291, a memory 290, a communication unit 293, an online marketplace module 270, a clock 294, a transfer module 274, a presentation module 295, a registration module 277, a verification module 278, other input/output devices 296, other applications 297, a logging module 298 and data storage 260. In an alternate embodiment, the workflow server 106 further comprises a display device 279, an output device 280, a unique device ID 292, an input device 281 and a stroke capture module 299.

Those skilled in the art will recognize that some of the components of the workflow server 106 have the same or similar functionality to the components of the computing device 102 so descriptions of these components will not be repeated here. For example, the processor 291, the memory 290, the communication unit 293, the logging module 298, the clock 294, the transfer module 274, the presentation module 295, the other input/output devices 296, the other applications 297, the display device 279, the output device 280, the unique device ID 292, the input device 281 and the verification module 278 have a similar functionality to the processor 203, the memory 204, the communication unit 207, the logging module 214, the clock 211, the transfer module 216, the presentation module 222, the other input/output devices 226, the other applications 224, the display device 206, the output device 215, the unique device ID 209, the input device 210 and the verification module 275 of FIG. 2A, respectively.

Some differences between the components of the workflow server 106 and the computing device 102 are noted below. For example, the communication unit 293 may couple the workflow server 106 to the network 104 in a wired manner instead of wirelessly. The processor 291 is more computationally powerful than the processor 203 as the workflow server 106 likely services numerous portable computing devices 102. The transfer module 274 is an e-mail server as opposed to an e-mail client. The display device 279 may be a cathode-ray tube, and the output device 280 is a set of speakers. The input device 281 includes a keyboard and mouse type controller. Those skilled in the art will recognize that there may be a variety of other differences as the components of the workflow server 106 acts as a hardware server as opposed to a remote client.

The logging module 298 generates a document log from the logs that are transmitted from the different portable computing devices 102. The document log is a central log of all activities that occurred with the document at the different portable computing devices 102. The document log includes the hashes from the page logs but not the details regarding what specifically occurred during each transaction. The specific actions can be recreated by retrieving the metadata associated with the document. The document log is described in greater detail with reference to FIG. 3D.

The registration module 277 is software and routines for generating identifiers and formalizing applications for being uploaded to the online marketplace module 270. In one embodiment, the registration module 277 is a routine executable by the processor 294 to generate identifiers and secret keys. The application is registered and transmitted to the online marketplace module 270 for uploading. The registration module 277 is coupled by the bus 320 to the processor 291, the memory 290 and the online marketplace module 270.

The online marketplace module 270 is software and routines for uploading applications to an online store, presenting applications for purchase, billing users that purchase applications and distributing credits to the developers. In one embodiment, the online marketplace module 270 is a routine executable by the processor 291 to bill a user for the initial purchase of an application and a subsequent fee for additional services as a monthly flat fee or per service. The online marketplace module 270 is coupled to the processor 291, the memory 290 and the registration module 277.

In one embodiment, the verification module 278 verifies any document that is transmitted in the system 100. The document is verified by the verification module 278 before the document is passed between portable computing devices 102 or displayed for sale by the online marketplace module 270.

In one embodiment, the data storage 260 is part of the workflow server 106. In an alternate embodiment, data storage 260 is coupled to the workflow server 106. For example, in such an alternate embodiment, the data storage 260 is an online storage service such as Amazon S3. The data storage 260 is a non-volatile memory device or similar permanent storage device and media. Data storage device 260 stores data and instructions for processor 291 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 260 is used to store the applications and associated metadata including hashes, identifiers, secret keys, signatures, etc.

Format of the Document, Pages and Metadata

Figure 3A:
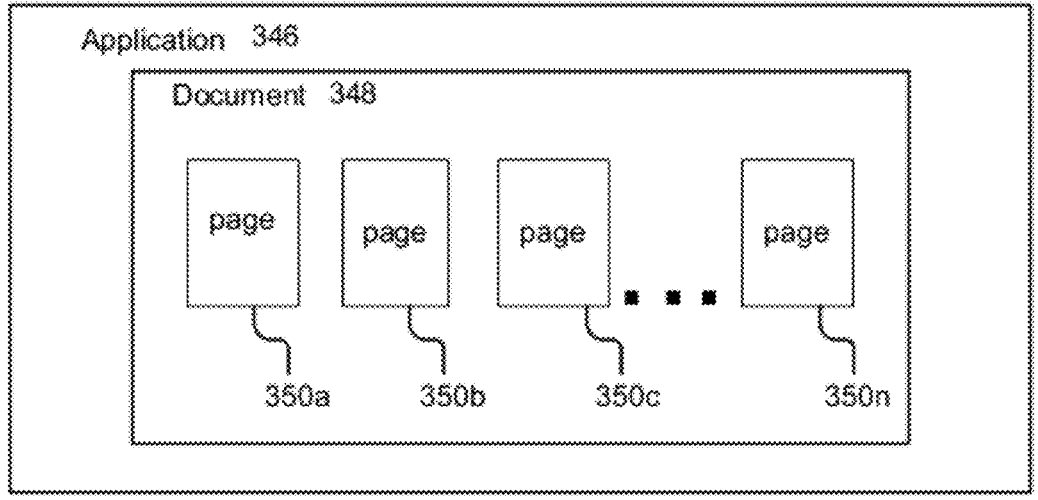
FIG. 3A is a block diagram of an application containing a document with pages in accordance with the present embodiment of invention.
Figure 3B:
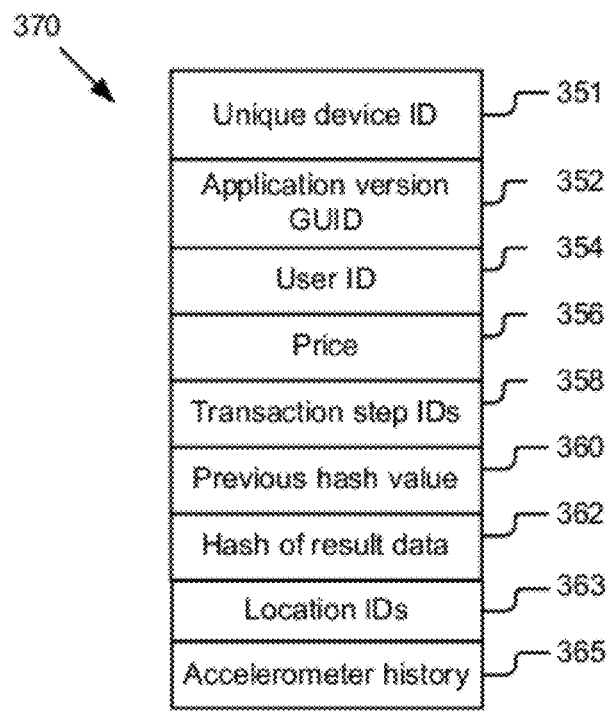
FIG. 3B is a graphical representation of a log entry in accordance with the present embodiment of invention.

To aid in understanding the differences between an application, a document and pages, FIG. 3A illustrates a graphical representation of an application 346. An application 346 contains software and routines for generating a document 348 or the document 348 is generated by other tools associated with that application 346. In one embodiment, an application 346 incorporates different modules for performing tasks, such as speech recognition, or the modules are be purchased separately. The document 348 comprises pages 350a, 350b, 350c . . . 350n. In one embodiment, a user purchases an application 346, generates a document 348 and provides information to fill out the pages 350a . . . n.

Each page of a document and the document itself contain a log of metadata. FIG. 3B illustrates one embodiment of a log entry 370 of metadata that is generated for each page and for a document log. In this example, a unique device ID 351 identifies the most recent computing device, such as a portable computing device 102 that makes a modification to the document. The application version GUID 352 is the identifier for the application being used. The user ID 354 identifies the most recent user to modify the document. The price 356 includes the price of the purchased application, the price of any subsequent actions to be performed, etc.

The transaction step IDs 358 contain all the steps that have been performed and will be performed on the application. This is used to track the status of the application as it is transmitted between portable computing devices 102 and the workflow server 106. For example, a portable computing device 102 purchases the application and inputs audio information into the document. The document is transmitted back to the workflow server 106 for translation services. Once the speech is translated to text, the translated document is transmitted back to the portable computing device 102. All these steps are recorded and tracked by the transaction step IDs 358.

The previous hash value 360 is the hash value of the prior log entry in the local log of the last computing device that modified the document. The hash of the result data 362 is a hash calculation of the results from this particular transaction. Each hash includes the cryptographic hash of the previous log entry. By including the hash value of the prior log entry, this information can be used at a later time and examined for verification by comparison with other entangled log entries. In another embodiment, the log entry 370 also includes a hash of the document or perhaps multiple hashes of portions of the document.

The cryptographic hashes are also called content based identifiers (CBIs) because they can be used to index data in addition to their use for verification. The CBI of the recent log entries are stored in other log files and published via email or other protocols. Maintaining logs that allow recreation of the document and the CBI for any data needed to redo the operation in the log file. The data itself is stored in the metadata directories for the pages and document, as discussed in further detail with regard to FIGS. 4A-C.

The location IDs 363 includes the location and time recorded for all user input data. In one embodiment the location IDs 363 are only recorded for sensitive information including personal information (name, address, social security), signatures, etc. The location takes a variety of forms including latitude, longitude and altitude; map coordinates; etc.

The accelerometer history 365 is a record of the acceleration of the portable computing device 102 at a particular time. In one embodiment, the accelerometer history 365 includes other data for creating a unique fingerprint, including a user identity, a key provided to the user, etc. In one embodiment, the accelerometer history 365 is also only recorded for sensitive information. However, since the relevant acceleration occurs for only brief moments, such as when an airplane takes off, in another embodiment the accelerometer history 365 is captures at scheduled intervals, such as every minute, ever five minutes, ever thirty minutes, etc. When the accelerometer 230 takes readings to generate the accelerometer history 365, the accelerometer 230 takes around 250 to 500 samples for a second or two.

The accelerometer history 365 is used by the verification module 278 to determine a mode of transportation of the device while the user was inputting information into the portable computing device. For example, a portable computing device 102 that is in a car that travels from 0 to 100 km/h in 2.4 s experiences an acceleration of 1.55 g, a commercial airplane experiences between 0.5 and 2 g and a high-g roller coaster has an acceleration of between 3.5 and 6.3 g. In one embodiment, the verification module 278 applies a Fast Fourier Transform to identify the mode of transportation by transforming the accelerometer history into frequency data.

Figure 3C:
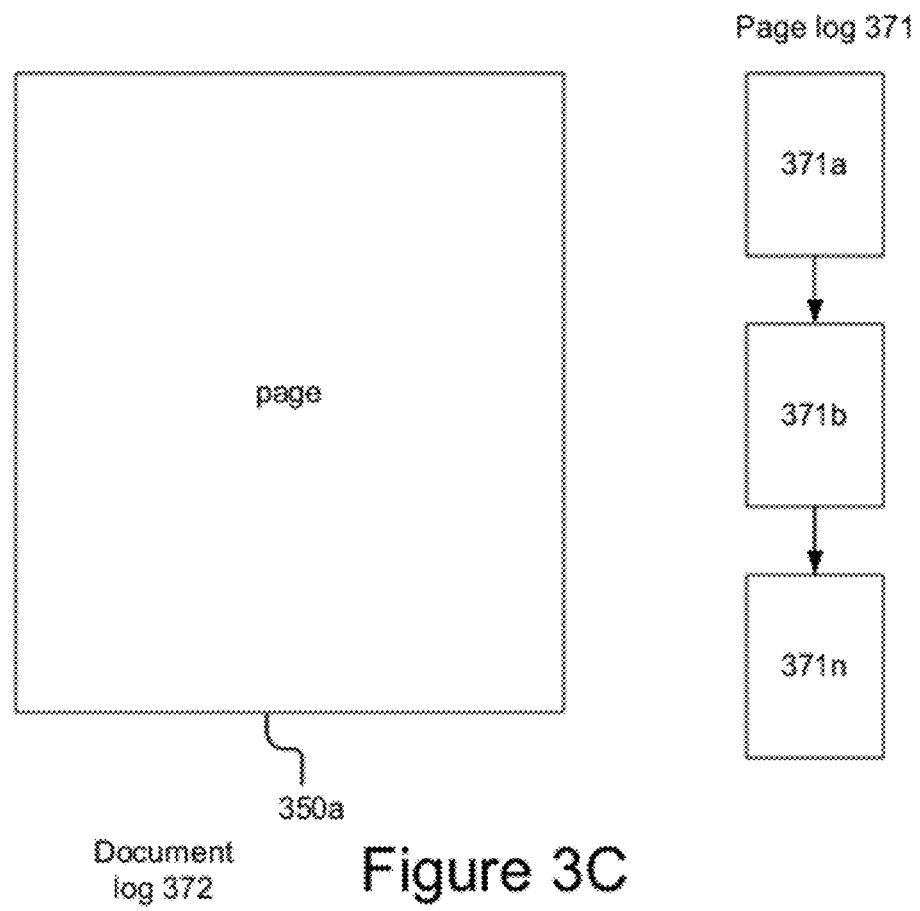
FIG. 3C is a graphical representation of a page log in accordance with the present embodiment of invention.

Turning now to FIG. 3C, a page 350a-350n (See FIG. 3A) and its corresponding page log 371 is illustrated. The document 348 comprises pages 350a that each includes their own page log 371. When a change is made of the document, a new hash is generated and the log is updated. Thus, 371a is a log for the original document, 371b is a log after a change is made to the document and 371n is a log after n changes have been made to the document.

Figure 3D:
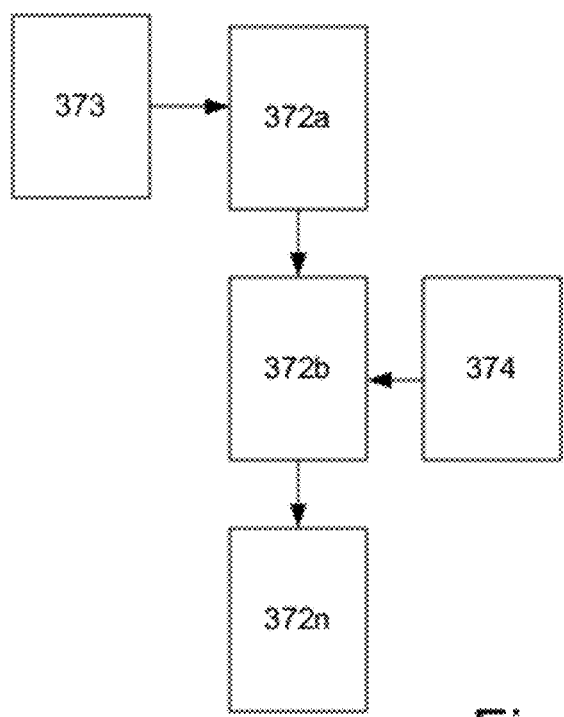
FIG. 3D is a graphical representation of a document log in accordance with the present invention.

FIG. 3D illustrates an example document log 372. A document log 372 is associated with the document as a whole and is referred to as an entangled log when the document log 372 incorporates log entry hashes from different computing devices. The document log 372 is stored as a file or collection of files associated with the document. In addition, the document log is stored on the workflow server 106, which coordinates transmission of the document based on the authenticity of the document log. Further details regarding authentication of the logs can be found in U.S. patent application Ser. No. 13/020,643, filed on Feb. 3, 2011 and titled "Creation of Signatures for Authenticating Applications," which is herein incorporated by reference in its entirety.

In this example a portable computing device 102 generates a page log 373 after the portable computing device 102 makes modifications to the document. The page log 373 is incorporated into the document log 372a for the entire document. The document log 372a does not list the exact modification that was made to the page. Instead, the document log 372a contains a hash of the changes that were made and a pointer to the location of information inside the directory, which is described in FIGS. 4B and 4C. Another modification is made to a page log 374 and page log 374 is incorporated into the document log 372b. All n modifications are incorporated into the document log 372n.

Logging Module 214

Figure 4A:
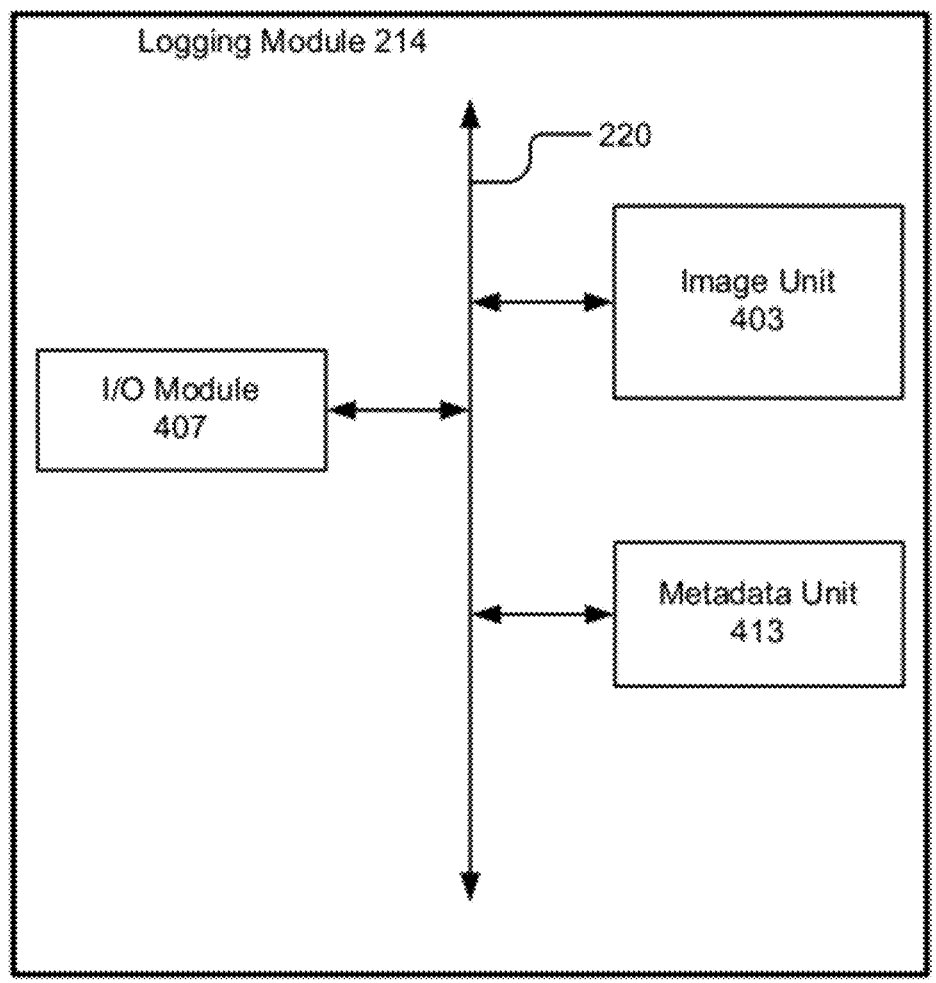
FIG. 4A is logging module in accordance with the present embodiment of invention.
Figure 4B:
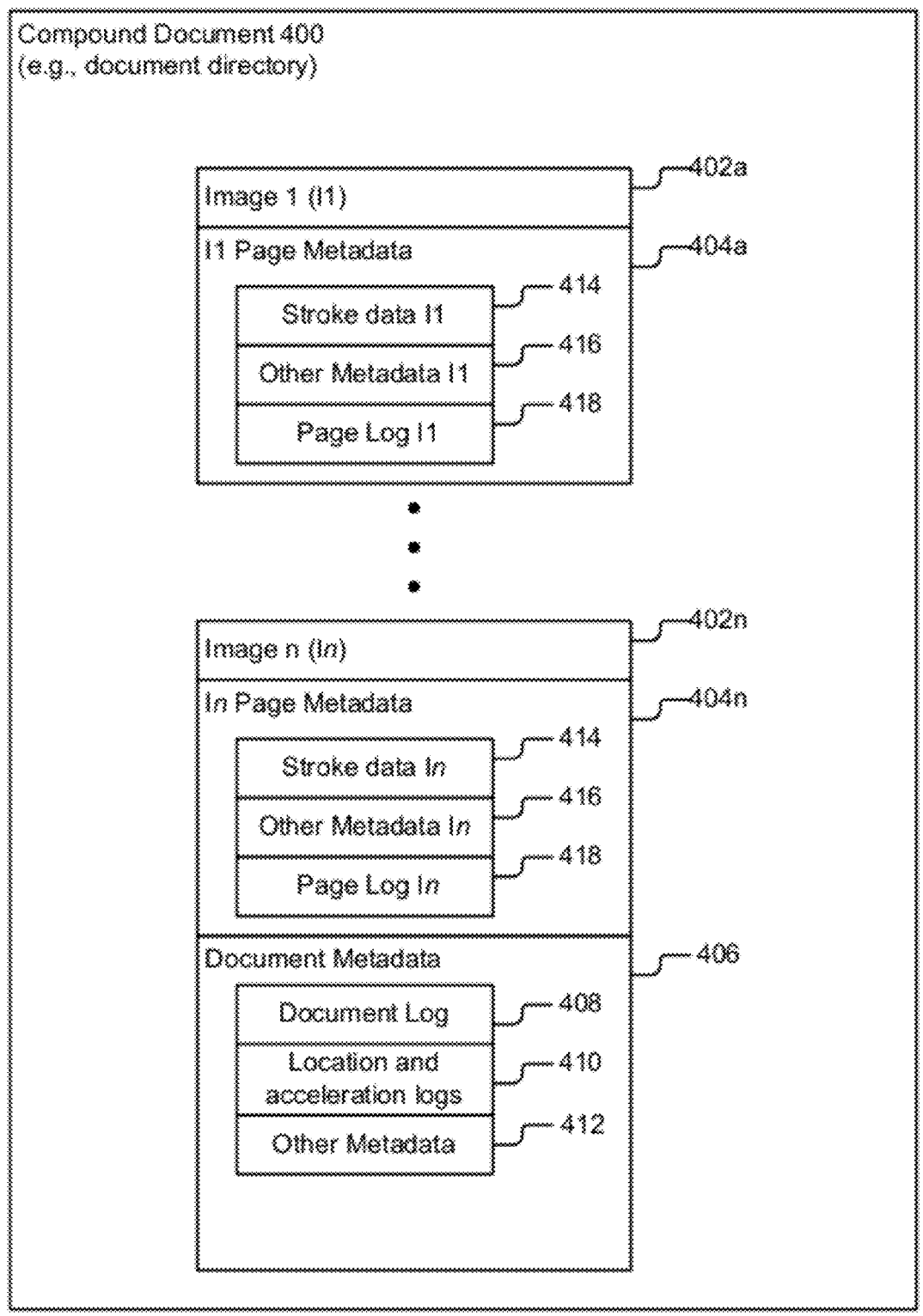
FIG. 4B is a block diagram representing an embodiment of a compound document in accordance with the present embodiment of invention.
Figure 4C:
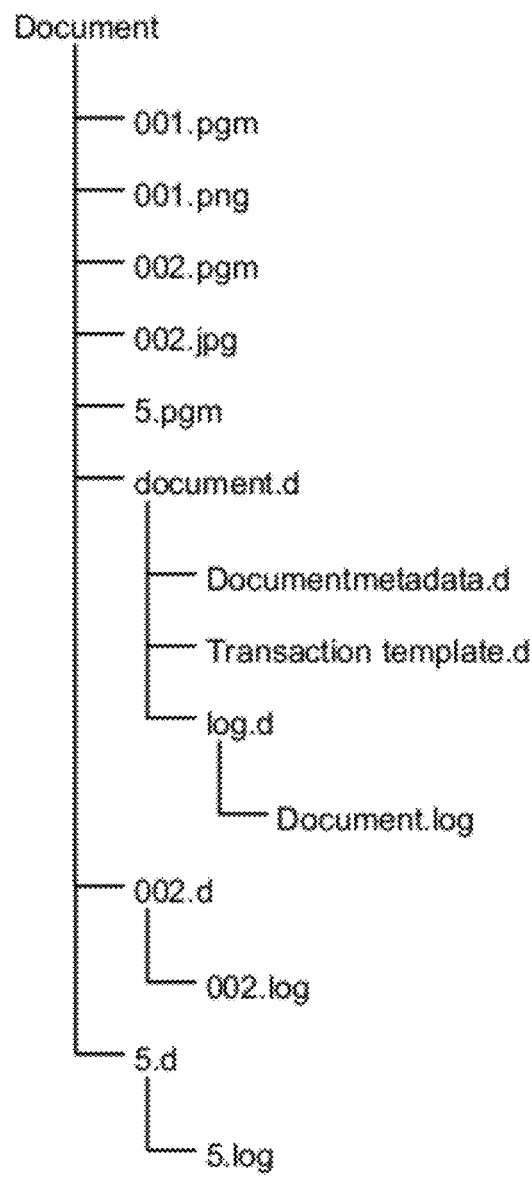
FIG. 4C is one example of a compound document in accordance with the present embodiment of invention.

FIG. 4A illustrates an embodiment of a logging module 214 that comprises an input/output module 407, an image unit 403 and a metadata unit 413 that are coupled to the bus 220. The input/output module 407 receives data from other modules, such as stroke segments from the stroke capture device and module 208 and transmits the images to the image unit 403 and the metadata to the metadata unit 413.

The image unit 403 receives an image and generates a raster form of the image that is transmitted to the metadata unit 413 for incorporation in a metadata directory for the page. The metadata unit 413 receives all metadata and stores information about changes on a page such as page creation, writing on a page and adding an image to a page. The logging module 214 also stores a timestamp for when a page is submitted or otherwise copied from one place, such as a portable computing device 102 to another place, such as the workflow server 106.

FIG. 4B illustrates a compound document 400. In this example, the compound document 400 includes a plurality of images 402a-402n that are denoted in the figure as Image 1 (I1) . . . . Image n (In). Each of the plurality of images 402a-402n may include associated page or image metadata 404a-404n. The page or image metadata 404a-404n includes stroke data 414, other metadata 416 and page log 418. Furthermore, the entire compound document 400 includes document metadata 406. The document metadata 406 includes a document log 408, a transaction template 410 and other document metadata 412.

The present invention advantageously stores the pages of the compound document 400 as images. This is particularly advantageous because it avoids requiring that the portable computing device 102 support a wide range of document formats. Providing pure images, i.e. not documents requiring rendering, to the portable computing device 102 ensures a consistent view and eliminates problems with inability to render fonts or other graphical commands.

When a page is created a raster form of the image is saved in the metadata directory for the page. The page log 418 is initialized with a "start log entry." The start log entry includes the current time as measured on the portable computing device 102 and might include a CBI from another log to establish that the page was created after the time of that CBI. In addition to the "start log entry," the logging module 214 stores a "page created" entry that includes the hash of the raster form of the starting image.

If the CBI of the page log 418 is published after the page is created, then it is possible to use that CBI to check if the page log 418 has been tampered with. If the page log 418 has not been modified, then the steps in the page log 418 can be followed. At first the only entry is the 'page created' entry. The CBI for the page image can be checked, and if it matches the raster image in the page metadata directory 404, then the format of the initial page is known not to have been tampered with since creation.

When strokes are added to a page, they are displayed in raster format on the display device 206, and they are stored in a stroke data file 414 in the metadata directory 404 for the page. A log entry is added to the page log 418, typically including the time and the CBI for the stroke file 414. Thus at a later point, if the page log 418 is verified, then the stroke data file 414 can be verified and the background image can be verified, if all of these items have not been modified then the stroke data file 414 can be used to redraw the strokes on the background image, thus recreating the page as it looked after strokes were added.

Note that to maintain pixel accuracy, the present invention uses a known algorithm to convert the stroke data file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation "image added" and the location and scale used to add the image e.g. (500,300) should be stored in the page log 418, along with the CBI of the raster form of the image.

Many applications can operate on the portable computing device 102 that only update pages by adding images or adding strokes. If additional changes are made to the page then log entries for these operations must be defined, the name of the operation must be stored in the log, and the hash of the data must be stored in the log. When a log entry is added to a page log 418, the unique device ID 351 of the portable computing device 102 is included in the entry. If a device is configured with a private key, then it might provide a digital signature of the stroke data 414 to indicate that the stroke date 414 was captured on the portable computing device 102. This signature is included in the page log 418.

Just as a page log 418 is created in a page metadata directory 404 when a new page is created, the logging module 214 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log 408 (along with a page identifier), the logging module 314 records just the CBI for the last entry in page log 418 when the page log 418 is updated. By storing the CBI from the page log 418 in the document log 408, the document log 408 is used to verify all the page logs 418. Whenever new entries are made to a page log 418, then an entry needs to be made to the document log 408, specifying that the page log of the altered page has been altered, and incorporating the most recent CBI of the altered page log 418. The CBI from the document log 408 is then published by email or other methods, rather than needing to publish information from each individual page log 418.

Entries in the document log 408 are similar to the page logs 418: they should include an "operation" and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the "operation" is stored in a file in the document metadata directory 406 and the CBI of that file included in the log. When the "operation" has no parameters, e.g. "strokes added" then the same file with the text of the operation can be stored once in the metadata directory and the CBI used multiple times. Of course the CBI of the actual stroke file is expected to differ in most cases, and the log entries have time stamps which differentiate individual entries. However, it is possible that a particular log entry with an identical set of log entry data will be written to multiple places with an identical CBI. This in no way invalidates the verification properties of either the page log 418 or the document log 408.

In addition to incorporating the changes made to page logs 418, the document log 408 stores certain types of information that apply to the document as a whole. For example, optical character recognition (OCR) information and barcode recognition information are saved in the page log 418. Video data is saved in the page log 418 as, for example, a link. Speech recording is more complicated because it is saved to the document log 408 if the information is not associated with a particular page. However, there are instances where the recording is linked to a specific page. For example, a patient fills out a form and a doctor records speech while flipping through the pages. In this situation the speech that is associated with a particular page is saved to the page log 418 and the complete speech file is saved to the document log 408.

The document metadata 406 also includes location and acceleration logs 410. In one embodiment, a location and acceleration are recorded every time a user makes a change to a document. Because this can drain the power, in another embodiment the location and acceleration are recorded only for sensitive information, such as a signature.

Document Format

In one embodiment, the basic format or structure of the document is a directory of including one or more files and directories. Inside the directory are a series of page images, as well as optional metadata. The metadata may be associated independently with each page, and/or metadata may be associated with the document as a whole. Such metadata is stored in further nested directories, and is optional. In one embodiment, each pages of the document is stored as an image. This is particularly advantageous because it avoids requiring that the portable computing device 102 support a wide range of document formats. Providing pure images, i.e. not files requiring rendering, to the portable computing device 102 ensures a consistent view and eliminates problems with inability to render fonts or other graphical commands. In one embodiment, the images are in one of the following file formats: JPEG, JPEG2000, JPM, PNG, PDF, TIFF or simple portable bit map (PBM) file format. Those skilled in the art will recognize that the document directories can be transferred and stored as standard ZIP format archives. Those skilled in the art will further recognize that many image formats are suitable for inclusion as page images, and that the above list represents a useful subset of existing formats that is in no way intended to limit the scope of the invention.

Multiple page image files which share the same initial name segment are considered to be alternate representations of the file, of equivalent quality, and the presentation module 222 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or common intermediate format (cif) identifies the resolution of the images.

Each of the plurality of images may include associated page or image metadata. The page or image metadata includes stroke data, other metadata and log data. For example, the page or image metadata may also include picture rectangles that identify areas in images at which capture images may be embedded or placed. Furthermore, the entire document includes document metadata. The document metadata includes a document log and other document metadata.

The metadata for the document is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. As a given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory containing one or more files, named "memphis.document.d". This directory is included at the top level directory. It is useful to store a log of actions associated with a document in the document metadata. In one embodiment, the logging module 214 also stores a version of an "original" document as document metadata. For example if the document was formed from a PDF, Microsoft Word, Microsoft Excel or other document, the original format document may be saved in the metadata directory.

In one embodiment, the page or image metadata is named with the same name segment as the page image, and ends in the extension ".d". For example, if the page image is named "page.001.jpg", the page metadata directory should be named "page.001.d" to indicate that it is associated with that page. In another embodiment, the page or image metadata includes the original image in some format for each page in the page metadata directory. This metadata is created as soon as the document is created e.g. by storing a raster format both at the top level directory and in the page metadata directory, or a copy of the original raster format may be stored when the page image is first changed. In other embodiments, the page or image metadata includes log data. This log data represents a log for changes applied to each page in the metadata directory for the page. The other metadata is used to store any other data related to a particular page or image. For example, if images are added to a page, it is useful to store these added images in the page metadata directory. An image might be added to a page for reasons similar to "stamping" a paper page, e.g. "received" or "submitted" thus providing a visual indication of the status of the page to any reader.

Multiple page image files which share the same initial name segment are considered to be alternate representations of the file, of equivalent quality, and the presentation module 222 may choose the representation most convenient for its use. So, for example as shown in FIG. 4C, a directory with the following contents: 001.pgm, 001.png, 002.pgm, 002.jpg and 5.pgm would yield a document with three pages. The first page is represented by one of two files, 001.pgm or 001.png. The second page is represented by one of two files, 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif identifies the resolution of the images.

Location Identifier Module 228

Figure 5:
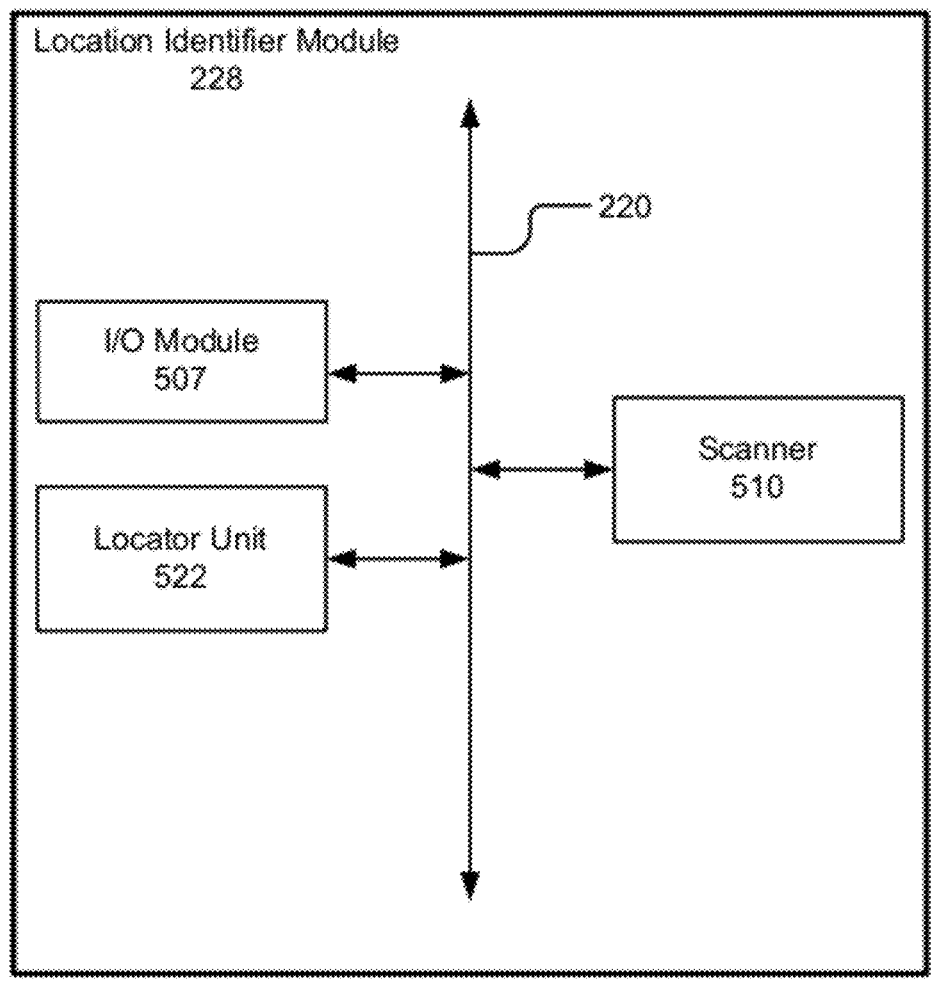
FIG. 5 is a block diagram representing an embodiment of a location identifier module.

FIG. 5 is one embodiment of a location identifier module 228 that comprises an input/output module 507, a scanner 510 and a locator unit 522, which are coupled to the bus 220. The scanner 510 scans for information regarding the portable computing device's 102 location including, for example, global position system (GPS) data and wireless network data including a wireless personal area network (PAN) (e.g. Bluetooth), a wireless local area network (WLAN) (e.g. Wi-Fi), a wireless metropolitan area network (MAN) (e.g. WiMAX), a wireless wide area network (WAN) and mobile device networks (i.e. cellular telephone networks).

When the scanner 510 locates GPS signals, the input/output module 507 receives messages from a minimum of four visible satellites. The messages include x, y and z components of position and the time sent. The input/output module 507 transmits the message to the locator unit 522, which determines the portable computing device's 102 position using a triangulation method that calculates the position based on the time it took for the messages to be received by the portable computing device 102.

When the scanner 510 locates wireless signals, the scanner 510 identifies the type of wireless network based on the signal. For example, the scanner 510 detects a media access control (MAC) address access point and retrieves the location of the access point from a MAC database using an internet connection. Similarly, the scanner 510 identifies Bluetooth device IDs and the input/output module 507 transmits the information to the locator unit 522, which uses a triangulation algorithm to determine the position of the portable computing device 102. In yet another embodiment, to track the portable computing device 102 using a cellular network, the scanner 510 emits a roaming signal to contact a nearby cellular tower and the scanner 510 receives a location and signal strength of the tower and the input/output module 507 transmits the information to the locator unit 522, which determines the portable computing device's 102 location using multilateration.

Methods

Figure 6:
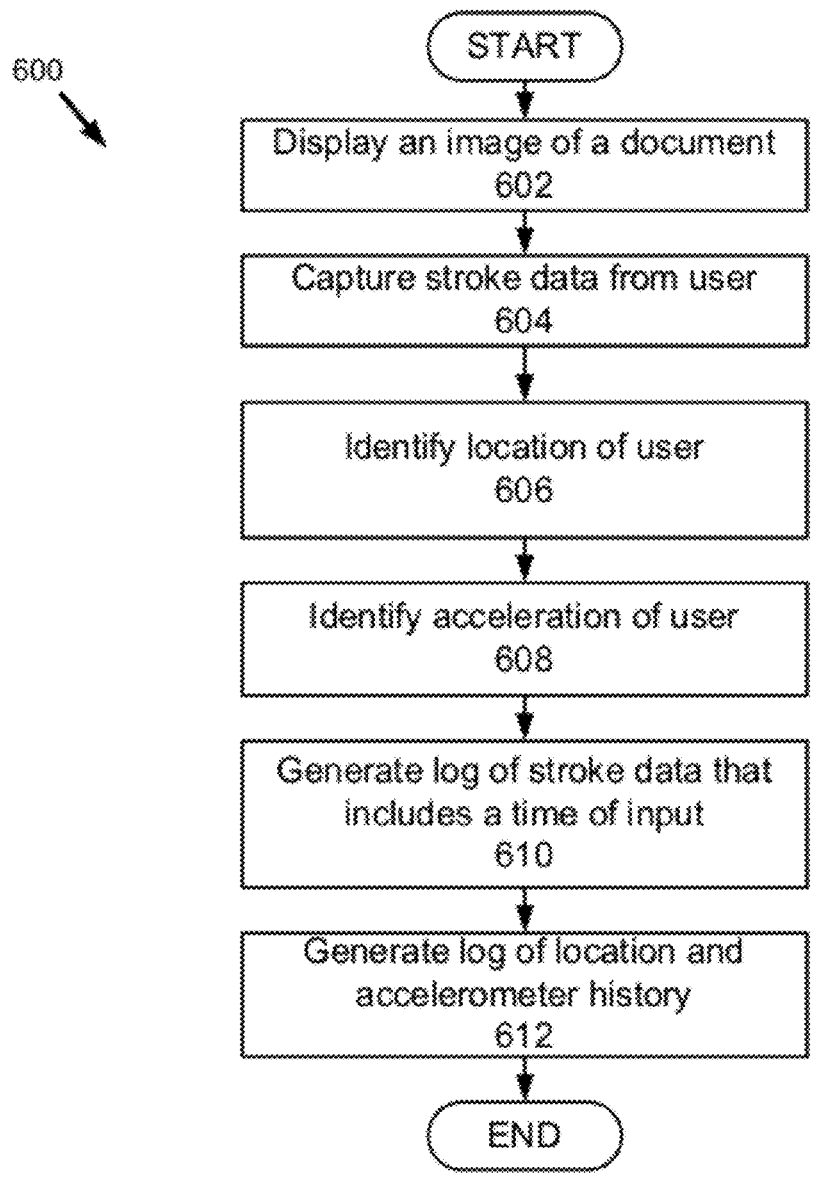
FIG. 6 is a flow diagram illustrating a process for generating a log of stroke data and a unique location and acceleration history.
Figure 7:
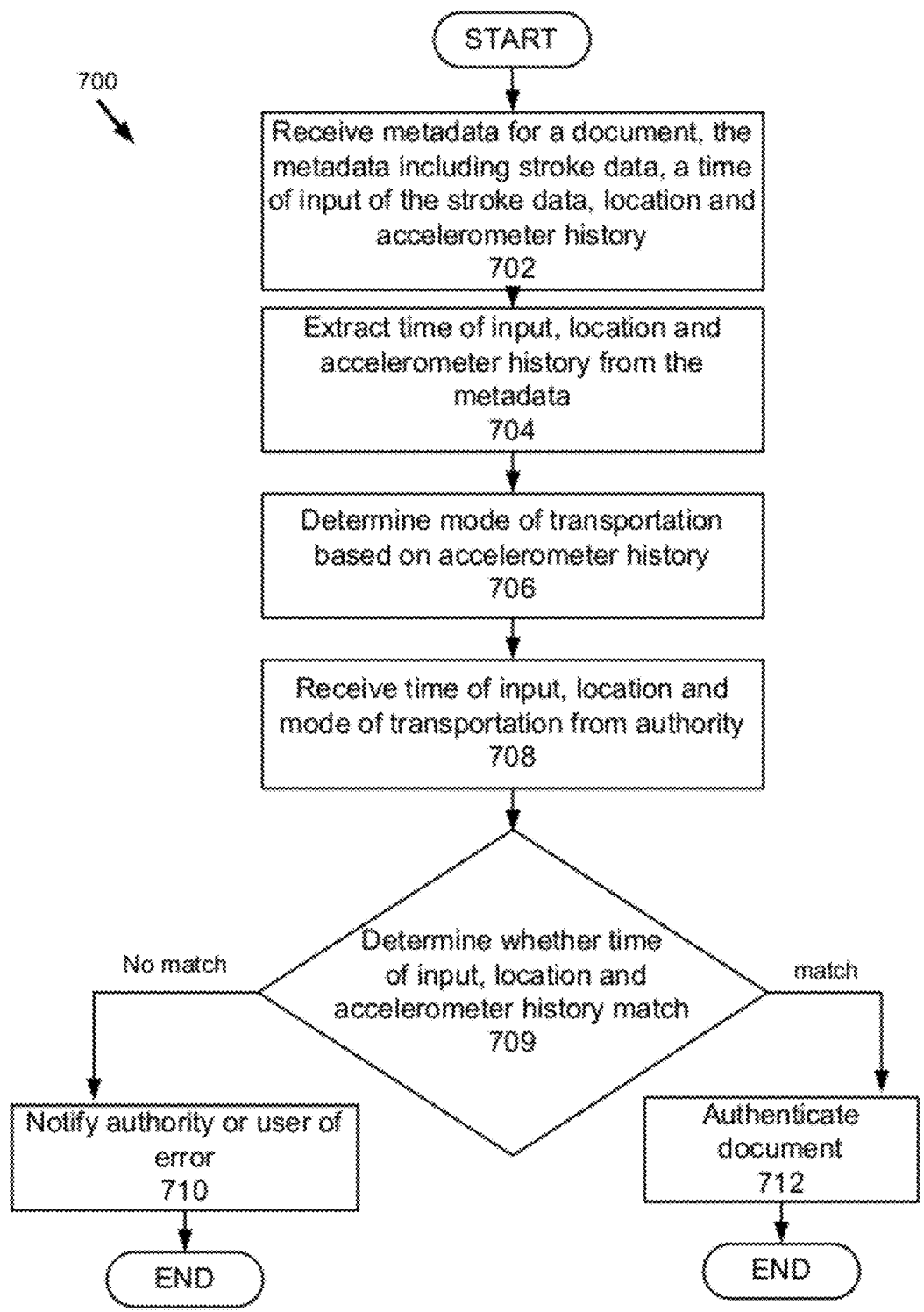
FIG. 7 is a flow diagram illustrating one embodiment of an authentication process.
Figure 8:
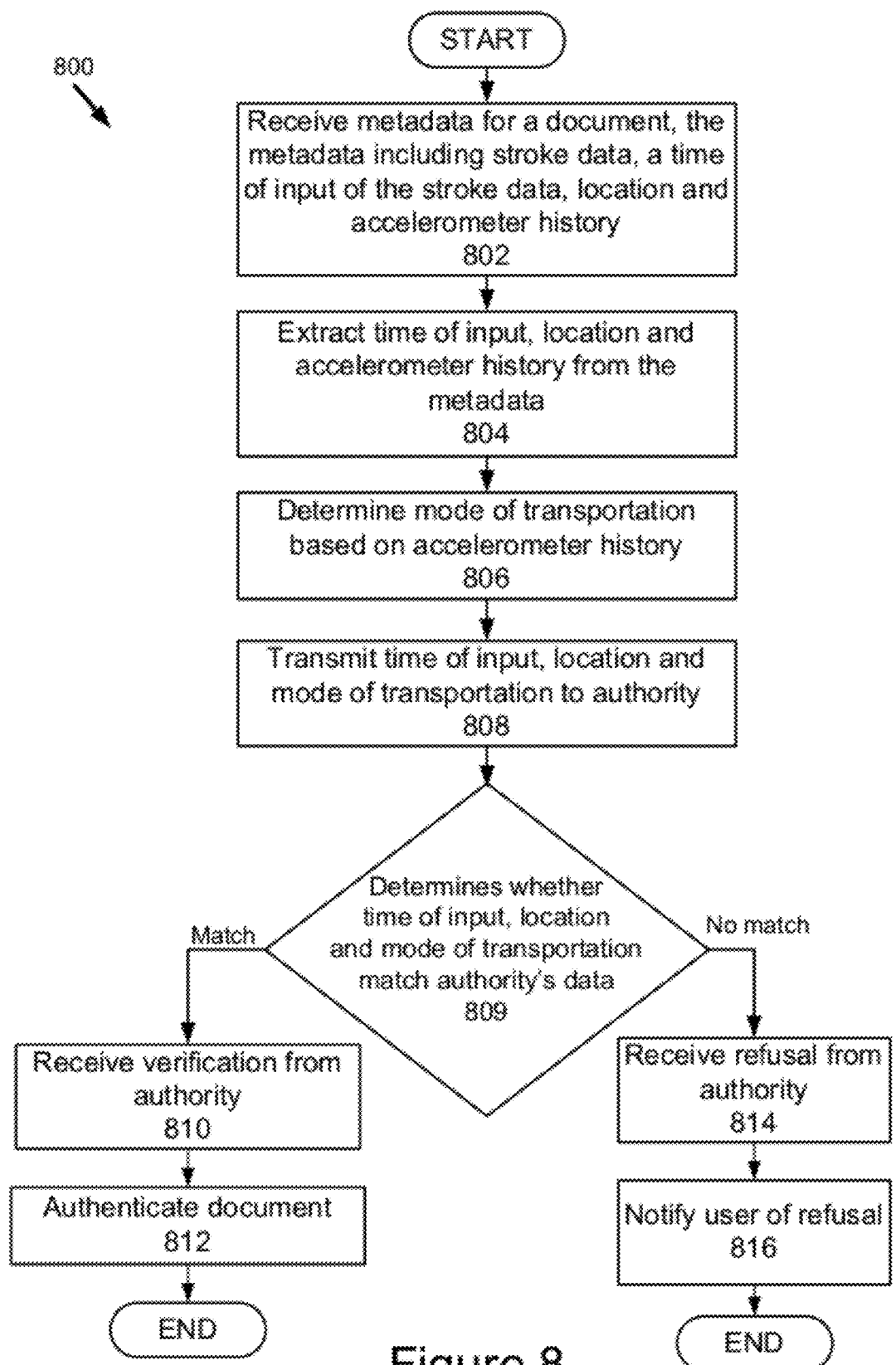
FIG. 8 is a flow diagram illustrating another embodiment of an authentication process.

Referring now to FIGS. 6-8, the methods of the present embodiment of invention will be described in more detail.

FIG. 6 illustrates one embodiment of a method 600 for generating a log of stroke data that includes a unique location and accelerometer history. The portable computing device 102 uses the presentation module 222 to display 602 an image of a document to a user. The stroke capture device and module 208 captures 604 strokes as the user moves the stylus or finger over the display device 206. The location identifier module 228 identifies 606 the location of the user by scanning and receiving GPS data, a wireless network or any other information that can be used to identify the location and by using the received data to determine the portable computing device's 102 position. The location identifier module 228 transmits the location information to the logging module 214. The accelerometer 230 identifies 608 the acceleration of the user as a function of time and transmits the accelerometer history to the analog to digital converter 231, which converts the accelerometer history from an analog signal to a digital signal. The analog to digital converter 231 transmits the digital signal of the accelerometer history to the logging module 214.

The logging module 214 receives the stroke data, the location information and the accelerometer history. The logging module 214 generates 610 a log of stroke data that includes a time of input for each stroke. Additional details about how the stroke data is logged can be found with reference to FIGS. 4B and 4C. For example, the logging module 214 generates an image of the page that contains the stroke data and generates a stroke data file 414 that stores the stroke data itself as page metadata 404.

The logging module 214 generates 612 a log of location and accelerometer history, for example taking the last 100 entries from a device accelerometer history including both acceleration vector and time stamp. In one embodiment, the log of location and accelerometer history also includes a device identifier and other information that can be used to generate a unique fingerprint.

FIG. 7 illustrates one embodiment of a method 700 for verifying the user's location. The metadata module 212 receives 702 metadata for a document, the metadata including stroke data, a time of input of the stroke data, a location and an accelerometer history. In one embodiment, the metadata also includes a device identifier, a user identifier and a key. The metadata module 212 extracts 704 the time of input, the location and the accelerometer history from the metadata. The extracted metadata is transmitted to the verification module 275/278. In one embodiment, the verification module 275 is stored on the portable computing device 102. In another embodiment, the verification module 278 is stored on the workflow server 106.

The verification module 275/278 determines 706 the mode of transportation based on the accelerometer history. In one embodiment, the verification module 275/278 applies a Fast Fourier Transform to convert the accelerometer history into a frequency. The verification module 275/278 compares the frequency to known vibrations to determine how the user was travelling. In another embodiment, the verification module 275/278 compares the accelerometer history to G-forces associated with different modes of transportation. The comparison can be from multiple entries over a long period of time, which is helpful for certain modes of transportation such as flying on an airplane because the airplane experiences a fast acceleration to get into the air and then travels at a steady speed for a certain amount of time. Alternatively, the comparison can be from entries taken while the user was entering sensitive information such as a signature on a document.

The verification module 275/278 receives 708 a time of input, location and mode of transportation from an authority. The authority can be another user or a component within the workflow server 106. The authority is designated during the setup process of the workflow server 106 or is specific to each document. The verification module 275/278 determines 709 whether the time of input, location and accelerometer history match. In one embodiment, matching is defined as an approximation. The extracted metadata can match within 30% of the information provided by the authority.

Alternatively, the match can be a more narrow match for two of the three items and the third item does not have to match. For example, if the time is within thirty minutes and the town is the same but the accelerometer history from the user is matched with a car and the authority stated that it was an airplane, the match is acceptable. If the verification module 275/278 determines that there is no match, the verification module 275/278 notifies 710 the authority or the user of an error via the transfer module 216. In the case of a verification module 278 stored on the workflow server 106, the verification module 278 also refuses to route the document to another portable computing device 102. If the verification module 275/278 determines that there is a match, the verification module 275/278 authenticates 712 the document. In the case of a verification module 278 stored on the workflow server 106, the verification module 278 initiates steps for routing the document to another portable computing device 102 for example, by extracting the intended destination from the metadata and notifying the transfer module 274 that the document can be routed.

In one embodiment, the authentication step is a condition of routing the document to another portable computing device 102. When the verification module 278 is stored on the workflow server 106, the workflow server 106 acts as an intermediate and requires authentication of the document before it is transmitted to any other portable computing device 102.

FIG. 8 illustrates another embodiment of a method 800 for verifying the user's location. The metadata module 212 receives 802 metadata for a document, the metadata including stroke data, a time of input of the stroke data, a location and an accelerometer history. The metadata module 212 extracts 804 the time of input, the location and the accelerometer history from the metadata. The metadata module 212 transmits the time of input, location and accelerometer history to the verification module 275/278. The verification module 275/278 determines 806 the mode of transportation based on the accelerometer history. The transfer module 216 transmits 808 the time of input, location and mode of transportation to an authority.

In one embodiment, the authority is stored on a remote server and receives the time of input, location and mode of transportation via the network 104. In another embodiment, the authority is a user that views the time of input, location and mode of transportation on a portable computing device 102 or some other computing device. The authority determines 809 whether the time of input, location and mode of transportation match the authority's data. In one embodiment the authority is a user that determines whether the received data is acceptable by viewing the time of input, location and mode of transportation on a display device. In another embodiment, the authority is software and modules for comparing the received data to known data about the user. If the information matches, the authority either inputs a verification notification into the display device or the authority directly transmits a verification notice to the verification module 275/278. The verification module 275/278 receives 810 the verification from the authority. The verification module 275/278 authenticates 812 the document. If the information does not match, the verification module 275/278 receives 814 a refusal from the authority and notifies 816 the user of the refusal.

The foregoing description of the embodiments of the present embodiment of invention has been presented for the purposes of illustration and description. It is not intended to be exhaustive or to limit the present embodiment of invention to the precise document disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific documents without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or documents. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the disclosure of the present embodiment of invention is intended to be illustrative, but not limiting, of the scope of the present embodiment of invention, which is set forth in the following claims.

The invention claimed is:

1. A computer-implemented method for verifying a user identity comprising:
   receiving metadata for a document, the metadata including stroke data, a first location and an accelerometer history recording acceleration of a portable computing device;
   extracting, with one or more processors, the first location and the accelerometer history from the metadata;
   identifying, with the one or more processors, a first set of user conditions based on the accelerometer history;
   receiving a second location and a second set of user conditions from an authority;
   determining whether the first and second locations match;
   determining whether the first and second sets of user conditions match; and
   responsive to determining that the sets of user conditions and the locations match, authenticating the document.

2. The method of claim 1, wherein the accelerometer history records the acceleration of the portable computing device while a user was travelling and inputting information into the portable computing device.

3. The method of claim 1, wherein the metadata also includes a first time of input of the stroke data and further comprising the steps of:
   extracting the first time of input from the metadata;
   receiving a second time of input from the authority;
   determining whether the first and second times of input match; and
   responsive to the first and second times matching, authenticating the document.

4. The method of claim 1, wherein responsive to a failure of the first and second locations to match, notifying at least one of a user and the authority of an error.

5. The method of claim 1, wherein determining that the sets of user conditions and the locations match includes determining that data extracted and identified from the metadata match a threshold percentage of data received from the authority.

6. The method of claim 1, further comprising routing the document.

7. A computer-implemented method for verifying a user identity comprising:
   receiving metadata for a document, the metadata including stroke data, a first location and an accelerometer history recording acceleration of a portable computing device;
   extracting, with one or more processors, the first location and the accelerometer history from the metadata;
   identifying, with the one or more processors, a first set of user conditions based on the accelerometer history;
   transmitting the first location and the first set of user conditions to an authority that determines whether the first location and a second location provided by the authority match and whether the first set of user conditions and a second set of user conditions provided by the authority match; and
   responsive to the authority determining that the sets of user conditions and the locations match, receiving a verification from the authority.

8. The method of claim 7, wherein the accelerometer history records the acceleration of the portable computing device while a user was travelling and inputting information into the portable computing device.

9. The method of claim 7, further comprising responsive to a failure of the first and second sets of user conditions to match, receiving a refusal from the authority.

10. The method of claim 7, wherein the metadata also includes a first time of input of the stroke data and further comprising the steps of:
    extracting the first time of input from the metadata;
    transmitting the first time of input to the authority that determines whether the first time of input and a second time of input provided by the authority match; and
    responsive to the authority determining that the first and second times match, receiving the verification.

11. The method of claim 10, further comprising responsive to the authority determining that the first and second times fail to match, receiving a refusal from the authority.

12. The method of claim 7, further comprising authenticating the document.

13. The method of claim 7, further comprising responsive to a failure of the first and second locations to match, receiving a refusal from the authority.

14. The method of claim 11, further comprising notifying a user of the refusal.

15. The method of claim 7, wherein determining that the sets of user conditions and the locations match includes determining that data extracted and identified from the metadata match a threshold percentage of data received from the authority.

16. The method of claim 7, further comprising routing the document.

17. The method of claim 1, wherein the authority is specific to the document.

18. The method of claim 1, responsive to a failure of the first and second locations to match, stopping routing of the document.

19. The method of claim 1, wherein identifying the first set of user conditions based on the accelerometer history includes transforming the accelerometer history into a frequency.

20. The method of claim 1, wherein authenticating the document includes validating a signature of a user on the document.

* * * * *